UNITED STATES PATENT OFFICE.

EDSON ALLEN HOFFMANN, OF FRANKFORT, KENTUCKY.

REDUCING DISTILLERY-SLOP TO DRY FEED.

965,521.      Specification of Letters Patent.    Patented July 26, 1910.

No Drawing.     Application filed June 24, 1909. Serial No. 504,094.

*To all whom it may concern:*

Be it known that I, EDSON ALLEN HOFFMANN, a citizen of the United States, and resident of Frankfort, Kentucky, have invented certain new and useful Improvements in Reducing Distillery-Slop to Dry Feed, of which the following is a specification.

My invention relates to an improved method of reducing distillery slop to dry feed, and has for its object to facilitate the separation of the nutritious elements or ingredients of distillery slop from the non-nutritious liquid in which they are contained, and to leave a liquid residue which may be run into streams, cess-pools or other sewage mediums without creating a nuisance.

My process may be described as follows. The slop formed in the distillery beer still (meaning thereby the receptacle of that name employed in whisky and spirits distilleries) is withdrawn therefrom and strained or run through the ordinary screen to separate the same into two portions, namely, a heavier and decidedly viscous portion, which may be termed for convenience, and for the purposes of my claims," thick slop"; and a lighter and less viscous portion, which may, for like purposes, be called "thin slop."

As is well known in this art, the slop is originally strong in acid contents, and among the acid contents is lactic acid, which is non-volatile. It is not desirable, and is no object to my invention, to completely neutralize such acid contents of the slop; where neutralizing alkaline agents have been added to the whole slop, as it comes from the beer still, in the prior art, the finished product, or cattle feed, has been totally lacking in acid contents, or has contained deleterious quantities of the neutralizing agent, and moreover, it has not been possible to extract from the slop more than ten and one-half pounds of dried feed to the bushel of grain in the mash, as a maximum, or nine pounds as an average. While, therefore, such neutralizing agents are used in my process, they are not added to the whole slop as it comes from the beer still, and they are not added merely for the purpose of neutralizing the acid contents from the mass, but for the purpose of facilitating the reduction of the liquid slop to dry feed, and for the conservation of the protein contained therein. With which explanation, I pass to the consideration of the next step of my process.

The first step as just described is well known in the art. It is a common expedient to separate the mass into "thick" and "thin" slop, and the latter is or may be partly used for filling up the fermenting tubs in the distillery; frequently one-half of such "thin" slop being so employed. The remainder of the "thin" slop has usually been fed to cattle, or thrown away as waste where local conditions prohibit the feeding of cattle. It has been attempted to utilize this "thin" slop by pumping it into the filter press in admixture with the "thick" slop, because the strained slop contains a high percentage of nutritive substance, the percentage being equal to, if not greater than, that contained in the "thick" slop. But when so pumped into the filter press the gluten, which forms its most valuable ingredient, clogs up the filtering screens to an extent which renders the filter press inoperative, and as its nutritious elements are held in suspension in a very finely divided condition, they have either passed through the filtering screens or have been blown out through the joints of the filter press. Again, the use of evaporating pans in the treatment of the "thin" slop has involved costly machinery, and made the cost of production excessive. My second step is the addition to the "thin" slop of an alkaline agent (such as lime, caustic soda, caustic potash, barium hydrate, ammonia or soda) to an extent which will produce the coagulation thereof. The coagulated thin slop is next heated to boiling temperature (although less favorable results can be obtained by omitting said heating to boiling temperature), mixed with the "thick" slop, the resulting mixture run through the ordinary filter press, or otherwise strained, and the strained mass dried by any of the means well known to the art.

By the employment of this process I have secured a net yield of fifteen pounds of dried feed to the bushel of grain mashed, or an increase of from fifty per cent. to seventy per cent. over the best known methods of the prior art; and the product of my process is considerably richer in protein and fat than that heretofore produced in the art. In addition to which advantages, the water finally discharged from the filter press is inoffensive and may be run into streams or sewers without creating a nuisance.

Having fully described my invention, what I claim as new and desire to have secured to me by the grant of Letters Patent, is:

1. The method of reducing distillery slop to dry feed comprising the following steps; separating the slop as it is withdrawn from the distillery beer still into thick slop and thin slop; mixing with the thin slop a sufficient quantity of alkaline substance to coagulate the same; mixing the coagulated thin slop with the thick slop; filtering the mixture to separate the water from the mass, and drying the mass, substantially as described.

2. The method of reducing distillery slop to dry feed comprising the following steps; separating the slop as it is formed in the distillery beer still into thick slop and thin slop; heating the thin slop to boiling temperature; adding to the boiling thin slop a sufficient quantity of alkaline substance to coagulate the same; mixing the thick slop and treated thin slop; filtering the mixture to separate the water from the mass; and drying the remainder, substantially as described.

In testimony whereof, I have signed my name to this specification, in presence of two subscribing witnesses.

EDSON ALLEN HOFFMANN.

Witnesses:
E. B. PODMAN,
W. J. GORMAN.